(12) United States Patent
Bodin et al.

(10) Patent No.: US 7,263,511 B2
(45) Date of Patent: Aug. 28, 2007

(54) CREATING USER METRIC PATTERNS INCLUDING USER NOTIFICATION

(75) Inventors: William Kress Bodin, Austin, TX (US); Michael John Burkhart, Round Rock, TX (US); Daniel G. Eisenhauer, Austin, TX (US); Daniel Mark Schumacher, Pflugerville, TX (US); Thomas J. Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/692,417

(22) Filed: Oct. 23, 2003

(65) Prior Publication Data

US 2005/0108405 A1 May 19, 2005

(51) Int. Cl.
*G06F 17/00* (2006.01)
*G06N 5/02* (2006.01)
*G06F 15/173* (2006.01)

(52) U.S. Cl. .............. 706/48; 706/21; 706/46; 706/47; 709/223; 709/224; 709/200; 340/5.22; 340/5.27; 340/995.22; 348/414.1; 348/417.1; 348/418.1; 348/422.1

(58) Field of Classification Search ............ 706/21, 706/48, 46, 47; 600/981; 709/223–224, 709/200; 340/10.1–10.6, 5.22, 5.27, 995.22; 341/1, 9; 342/360; 348/175, 177, 414.1, 348/417.1, 418.1, 422.1

See application file for complete search history.

(56) References Cited

U.S. PATENT DOCUMENTS

| | | | |
|---|---|---|---|
| 4,461,301 A * | 7/1984 | Ochs ..................... 600/301 |
| 5,058,180 A * | 10/1991 | Khan ..................... 382/158 |
| 5,761,083 A * | 6/1998 | Brown et al. .............. 700/296 |
| 6,345,264 B1 | 2/2002 | Breese et al. |
| 6,418,424 B1 * | 7/2002 | Hoffberg et al. ............. 706/21 |
| 6,645,153 B2 * | 11/2003 | Kroll et al. ................ 600/481 |
| 2002/0043568 A1 | 4/2002 | Hess et al. |
| 2002/0095586 A1 | 7/2002 | Doyle et al. |
| 2002/0135618 A1 | 9/2002 | Maes et al. |
| 2002/0184373 A1 | 12/2002 | Maes |
| 2003/0145128 A1 * | 7/2003 | Baird et al. ................ 709/321 |
| 2003/0195957 A1 * | 10/2003 | Banginwar ................ 709/223 |
| 2004/0113756 A1 * | 6/2004 | Mollenkopf ........... 340/310.01 |
| 2005/0021484 A1 * | 1/2005 | Bodin et al. .................. 706/21 |
| 2005/0050137 A1 * | 3/2005 | Bodin et al. ................ 709/200 |
| 2005/0071462 A1 * | 3/2005 | Bodin et al. ................ 709/224 |

OTHER PUBLICATIONS

Remote Controlling System for Home Electronic Equipment via E-mail; Jan. 2002; p. 108; Research Disclosure; US.

* cited by examiner

*Primary Examiner*—Ramesh Patel
(74) *Attorney, Agent, or Firm*—John Biggers; Diana L. Roberts; Biggers & Ohanian, LLP

(57) ABSTRACT

Exemplary embodiments of the present invention include a method for creating a user metric pattern. Such embodiments typically include receiving, within the network, a plurality of disparate user metrics, determining that the plurality of disparate user metrics received within the network do not match a predetermined metric pattern, and saving the plurality of disparate user metrics as a new metric pattern. In many embodiments, determining that the plurality of disparate user metrics received within the network do not match a predetermined metric pattern includes comparing the plurality of disparate user metrics with a plurality of metrics associated with the predetermined metric pattern.

21 Claims, 8 Drawing Sheets

CREATING USER METRIC PATTERNS INCLUDING USER NOTIFICATION

BACKGROUND OF THE INVENTION

1. Field of the Invention

The field of the invention is data processing, or, more specifically, methods, systems, and products for administering devices within a network.

2. Description of Related Art

Conventional networks contain various devices. A user often uses the various devices, or adjusts the particular settings of the devices, in dependence upon the user's current condition. That is, a user's current condition often motivates the user to change the settings of devices so that the devices operate in a manner that more positively benefits the user's current condition. For example, a user with a headache may be disturbed by a powerful light. The user may dim the light, or turn the light off, so that the light no longer disturbs the user. Conventional networked devices, however, require user intervention to individually administer the specific device in response to user condition. It would be advantageous if there were a method of administering devices within a network in dependence upon user condition that did not require user intervention.

SUMMARY OF THE INVENTION

Exemplary embodiments of the present invention include a method for creating a user metric pattern. Such embodiments typically include receiving, within the network, a plurality of disparate user metrics, determining that the plurality of disparate user metrics received within the network do not match a predetermined metric pattern, and saving the plurality of disparate user metrics as a new metric pattern. In many embodiments, determining that the plurality of disparate user metrics received within the network do not match a predetermined metric pattern includes comparing the plurality of disparate user metrics with a plurality of metrics associated with the predetermined metric pattern.

In some embodiments of the present invention, receiving, within the network, a plurality of disparate user metrics includes receiving a plurality of disparate user metrics from a metric sensor. In many embodiments, saving the plurality of disparate user metrics as a new metric pattern includes creating a metric list including the plurality of disparate user metrics, and associating the metric list with a user metric pattern data structure.

Many embodiments also include receiving, from a user, an instruction to save the plurality of disparate user metrics as a new metric pattern and editing the new metric pattern. Some embodiments also include associating an action with the metric pattern.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
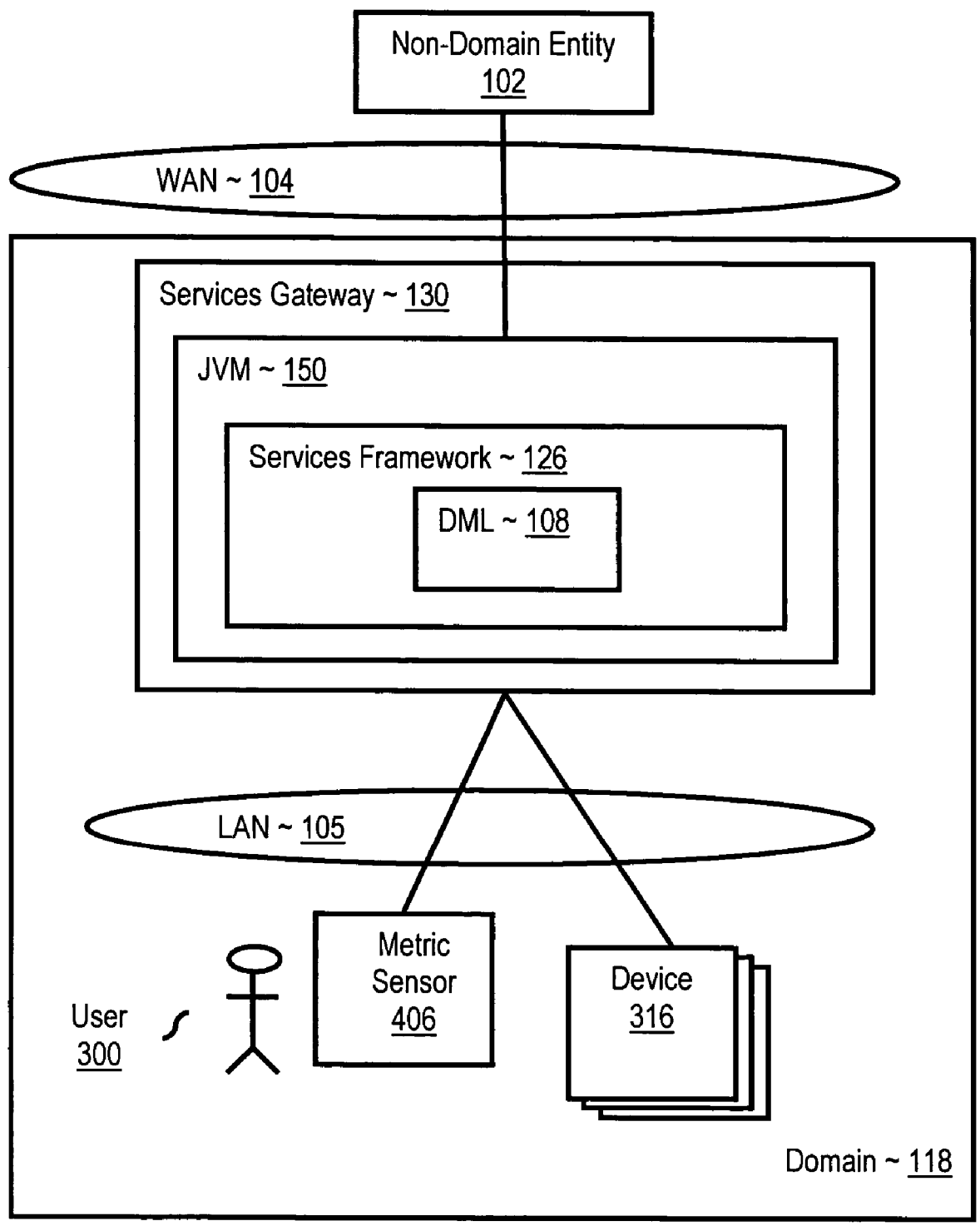
FIG. 1 is a block diagram illustrating an exemplary architecture useful in implementing methods for administering devices in accordance with the present invention.

The present invention is described to a large extent in this specification in terms of methods for administering devices. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Driver" means a program that controls a device. A device (printer, disk drive, keyboard) typically has a driver. A driver acts as translator between the device and software programs that use the device. Each device has a set of specialized commands that its driver knows. Software programs generally access devices by using generic commands. The driver, therefore, accepts generic commands from a program and then translates them into specialized commands for the device.

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a services gateway, PC, or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

The HomePlug protocol allows HomePlug-enabled devices to communicate across powerlines using Radio Frequency signals (RF). The HomPlug protocol uses Orthogonal Frequency Division Multiplexing (OFDM) to split the RF signal into multiple smaller sub-signals that are then transmitted from one HomPlug enabled-device to another HomePlug-enabled device at different frequencies across the powerline.

"HTTP" stands for 'HyperText Transport Protocol,' the standard data communications protocol of the World Wide Web.

"ID" abbreviates "identification" as used by convention in this specification with nouns represented in data elements, so that 'user ID' refers to a user identification and 'userID' is the name of a data element in which is stored a user identification. For a further example of the use of 'ID': 'metric ID' refers to a metric identification and 'metricID' is the name of a data element in which is stored a metric identification.

"IEEE 1394" is an external bus standard that supports data transfer rates of up to 400 Mbps (400 million bits per second). Apple, which originally developed IEEE 1394, uses the trademarked name "FireWire." Other companies use other names, such as i.link and Lynx, to describe their 1394 products.

A single 1394 port can be used to connect up to 63 external devices. In addition to high speed, 1394 also supports isochronous data transfer—delivering data at a guaranteed rate. This makes it ideal for devices that need to transfer high levels of data in real-time, such as video.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapitalized) is any network using IP as the network layer in its network protocol stack.

"JAR" is an abbreviation for 'Java archive.' JAR is a file format used to bundle components used by a Java application. JAR files simplify downloading applets, because many components (.class files, images, sounds, etc.) can be packaged into a single file. JAR also supports data compression, which further decreases download times. By convention, JAR files end with a '.jar' extension.

"JES" stands for Java Embedded Server. JES is a commercial implementation of OSGi that provides a framework for development, deployment, and installation of applications and services to embedded devices.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"LonWorks" is a networking platform available from Echelon®. Lon Works is currently used in various network applications such as appliance control and lighting control. The LonWorks networking platform uses a protocol called "LonTalk" that is embedded within a "Neuron Chip" installed within Lon Works-enabled devices.

The Neuron Chip is a system-on-a-chip with multiple processors, read-write and read-only memory (RAM and ROM), and communication and I/O subsystems. The read-only memory contains an operating system, the LonTalk protocol, and an I/O function library. The chip has non-volatile memory for configuration data and for application programs, which can be downloaded over a LonWorks network to the device. The Neuron Chip provides the first 6 layers of the standard OSI network model. That is, the Neuron Chip provides the physical layer, the data link layer, the network layer, the transport layer, the session layer, and the presentation layer.

The Neuron Chip does not provide the application layer programming. Applications for LonWorks networks are written in a programming language called "Neuron C."

Applications written in Neuron C are typically event-driven, and therefore, result in reduced traffic on the network.

"OSGI" refers to the Open Services Gateway Initiative, an industry organization developing specifications for services gateways, including specifications for delivery of service bundles, software middleware providing compliant data communications and services through services gateways. The Open Services Gateway specification is a java based application layer framework that gives service providers, network operator device makers, and appliance manufacturer's vendor neutral application and device layer APIs and functions.

"SMF" stands for "Service Management Framework™" available from IBM®. SMF is a commercial implementation of OSGi for management of network delivered applications on services gateways.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

The "X-10" means the X-10 protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts which represent digital information.

In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

EXEMPLARY ARCHITECTURE

FIG. 1 is a block diagram of exemplary architecture useful in implementing methods of administering devices in accordance with embodiments of the present invention. The architecture of FIG. 1 includes a domain (118). The term "domain" in this specification means a particular networked environment. Examples of various domains include home networks, car networks, office network, and others as will occur to those of skill in the art.

The domain (118) of FIG. 1 includes a services gateway (130). A services gateway (130) is, in some exemplary architectures, an OSGi compatible services gateway (130). While exemplary embodiments of methods for administering devices are described in this specification using OSGi, many other applications and frameworks will work to implement the methods of administering devices according to the present invention and are therefore also well within the scope of the present invention. Commercial implementations of OSGi, such as JES and SMF, are also useful in implementing methods for administering devices.

In the exemplary architecture of FIG. 1, the services gateway (126) includes a services framework (126). The services framework (126) of FIG. 1 is a hosting platform for running 'services.' Services are the main building blocks for creating applications in the OSGi. An OSGi services framework (126) is written in Java and therefore, typically runs on a Java Virtual Machine (JVM) (150).

The exemplary architecture of FIG. 1 includes a DML (108). "DML" (108) is an abbreviation for Domain Mediation Layer. In many embodiments of the architecture of FIG. 1, the DML (108) is application software useful in implementing methods of administering devices and creating metric patterns in accordance with the present invention. In some embodiments of the present invention, the DML is OSGi compliant application software, and is therefore implemented as a service or a group of services packaged as a bundle installed on the services framework (126). In this specification, DMLs are often discussed in the context of OSGi. However, the discussion of OSGi is for explanation and not for limitation. In fact, DMLs according to various embodiments of the present invention can be implemented in any programming language, C, C++, COBOL, FORTRAN, BASIC, and so on, as will occur to those of skill in the art, and DMLs developed in languages other than Java are installed directly upon an operating system or operating environment rather than a JVM.

In the exemplary architecture of FIG. 1, the services gateway (130) is coupled for data communications with a metric sensor (406). A metric sensor (406) is a device that reads an indication of a user's condition, and creates a user metric in response to the indication of the user's condition. An "indication of a user's condition" is a quantifiable aspect of a user's condition and a quantity measuring the aspect. For example, a quantifiable aspect of a user's condition is a body temperature of 99.2 degrees Fahrenheit. Examples of quantifiable aspects of a user's condition include body temperature, heart rate, blood pressure, location, galvanic skin response, and others as will occur to those of skill in the art.

A "user metric" is a data structure representing an indication of user condition. In many examples of methods for administering devices in accordance with the present invention, a user metric is implemented as a data structure, class, or object that includes a userID field, a metricID field, and a metric value field. A typical userID field identifies the user whose indication of condition is represented by the metric. A typical metricID field identifies the quantifiable aspect of user condition the metric represents, such as, for example, blood pressure, heart rate, location, or galvanic skin response. A typical metric value field stores a quantity measuring the aspect of a user's condition.

Wearable and wireless heart rate monitors, galvanic skin response monitors, eye response monitors, and breathing monitors useful as or easily adaptable for use as metric sensors are currently available from Quibit Systems, Inc. The 'Polar' series of heart rate monitors from Body Trends, Inc., and the magnetoelastic gastric pH sensors from Sentec Corporation are other examples of readily available biomedical sensors useful as or easily adaptable for use as metric sensors.

In order for a conventional sensor, such as a biomedical sensor, to be useful as a metric sensor that transmits multiple metric types in a domain containing multiple users, the sensor advantageously transmits not only a value of the each aspect it measures, but also transmits a user ID and a metricID. The user ID is useful because typical embodiments of the present invention include a DML capable of administering devices on behalf of many users simultaneously. The metricID is useful because a single user may employ more than one metric sensor at the same time or employ a metric sensor capable of monitoring and transmitting data regarding more than one aspect of user condition. All wireless sensors at least transmit a metric value according to some wireless data communications protocol. To the extent that any particular sensor 'off-the-shelf' does not also transmit user ID or metricID, such a sensor is easily adapted, merely by small modifications of its controlling software, also to include in its transmissions user IDs and metricID.

Although it is expected that most DMLs will support metric IDs and user IDs, it is possible, under some circumstances within the scope of the present invention, to use an off-the-shelf sensor as a metric sensor even if the sensor does not provide metric ID and user ID in its output telemetry. Consider an example in which only a single person inhabits a domain having devices controlled or administered by a DML tracking only a single metric, such as, for example, heart rate. A DML tracking only one metric for only one user could function without requiring a metric type code in telemetry received from the metric sensor because, of course, only one type of metric is received. In this example, strictly speaking, it would be possible for an off-the-shelf, Bluetooth-enabled heart rate sensor, such as a 'Polar' sensor from Body Trends, to function as a metric sensor. This example is presented only for explanation, because as a practical matter it is expected that most DMLs according to embodiments of the present invention will usefully and advantageously administer more than one type of metric (therefore needing a metric ID code in their telemetry) on behalf of more than one user (therefore needing a user ID in their telemetry).

In many embodiments of the present invention, the metric sensor is advantageously wirelessly coupled for data communications with the services gateway (130). In many alternative embodiments, the metric sensor transmits the user metric to the DML through a services gateway using various protocols such as Bluetooth, 802.11, HTTP, WAP, or any other protocol that will occur to those of skill in the art.

In the exemplary architecture of FIG. 1, the domain (118) includes a device (316) coupled for data communications with the services gateway (130) across a LAN (105). In many embodiments of the present invention, a domain (118) will include many devices. A home domain, for example, may include a home network having a television, numerous lights, a refrigerator, a freezer, a coffee pot, a dishwasher, a dryer, a CD player, a DVD player, a personal video recorder, or any other networkable device that will occur to those of skill in the art. For ease of explanation, the exemplary architecture of FIG. 1 illustrates only three devices (316), but the use of any number of devices is well within the scope of the present invention.

To administer the device (316), the DML often has a device class for the device containing accessor methods that get and set attributes on the device, and in some cases, a communication class that provides the protocols needed to communicate with the device. In some examples of the architecture of FIG. 1, a DML has pre-installed upon it, device classes and communications classes for many devices that the DML supports.

To the extent the DML does not have a preinstalled device class and communications class for a particular device, the DML can obtain the device class and communications class in a number of ways. One way the DML obtains the device class and communications class for the device is by reading the device class and the communications class from the device. This requires the device to have enough installed memory to store the device class and communications class. The DML can also obtain the device class and communications class from devices that do not contain the device class or communications class installed upon them. One way the DML obtains the device class and communications class is by reading a device ID from the device, searching the Internet for the device class and communications class, and downloading them. Another way the DML obtains the device class and communications class is by reading a network location from the device downloading, from the network location, the device class and communications class. Three ways have been described for obtaining the device classes and communications classes needed to administer devices in accordance with the present invention. Other methods will also occur to those of skill in the art.

The exemplary architecture of FIG. 1 includes a non-domain entity (102) that is coupled for data communications with the services gateway (130) across a WAN (104). A "non-domain entity" is any computing device or network location coupled for data communications to the domain but not within the domain. The phrase "non-domain entity" is broad and its inclusion in the architecture of FIG. 1 acknowledges that in many embodiments of architecture useful in implementing methods of administering devices in accordance with the present invention, a given domain is coupled for data communications with outside non-domain entities.

An example of a non-domain entity is a web server (outside the domain) of a manufacturer of the device (316) installed within the domain. The manufacturer may operate a website that makes available for download drivers for the device, updates for the device, or any other information or software for the device. Drivers, updates, information or software for the device are downloadable to the device across a WAN and through the services gateway.

Figure 2:
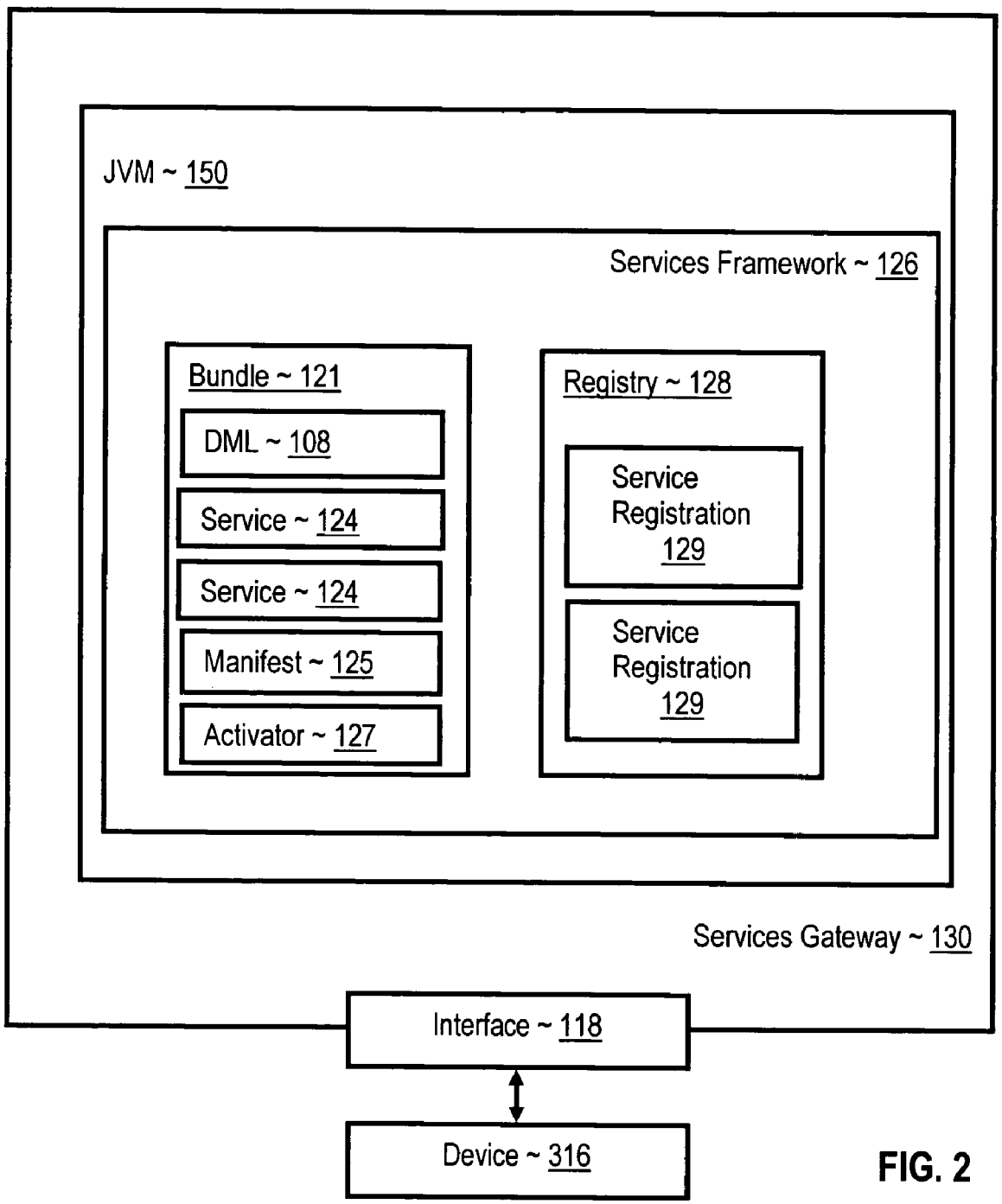
FIG. 2 is a block diagram illustrating an exemplary services gateway.

FIG. 2 is a block diagram of an exemplary services gateway (130) useful in implementing methods of administering devices according to the present invention. The services gateway (130) of FIG. 2 is, in some exemplary architectures useful in embodiments of the present invention, an OSGi compatible services gateway (130). While exemplary embodiments of methods for administering devices and creating user metric patterns are described in this specification using OSGi, many other applications and frameworks other than OSGi will work to implement methods of administering devices and methods for creating user metric patterns according to the present invention and are therefore well within the scope of the present invention. Commercial implementations of OSGi, such as JES and SMF, are also useful in implementing methods of the present invention.

OSGi Stands for 'Open Services Gateway Initiative.' The OSGi specification is a Java-based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

The services gateway (130) of FIG. 2 includes a service framework (126). In many example embodiments the service framework is an OSGi service framework (126). An OSGi service framework (126) is written in Java and therefore, typically runs on a Java Virtual Machine (JVM). In OSGi, the service framework (126) of FIG. 1 is a hosting platform for running 'services' (124). The term 'service' or 'services' in this disclosure, depending on context, generally refers to OSGi-compliant services.

Services (124) are the main building blocks for creating applications according to the OSGi. A service (124) is a group of Java classes and interfaces. The OSGi specification provides a number of standard services. For example, OSGi provides a standard HTTP service that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services (124) in OSGi are packaged in 'bundles' (121) with other files, images, and resources that the services (124) need for execution. A bundle (121) is a Java archive or 'JAR' file including one or more service implementations (124), an activator class (127), and a manifest file (125). An activator class (127) is a Java class that the service framework (126) uses to start and stop a bundle. A manifest file (125) is a standard text file that describes the contents of the bundle (121).

In the exemplary architecture of FIG. 2 includes a DML (108). In many embodiments of the present invention, the DML is an OSGi service that carries out methods of administering devices and methods of creating metric patterns in accordance with the present invention. The DML (108) of FIG. 2 is packaged within a bundle (121) and installed on the services framework (126).

The services framework (126) in OSGi also includes a service registry (128). The service registry (128) includes a service registration (129) including the service's name and an instance of a class that implements the service for each bundle (121) installed on the framework (126) and registered with the service registry (128). A bundle (121) may request services that are not included in the bundle (121), but are registered on the framework service registry (128). To find a service, a bundle (121) performs a query on the framework's service registry (128).

Exemplary Classes and Class Cooperation

Figure 3:
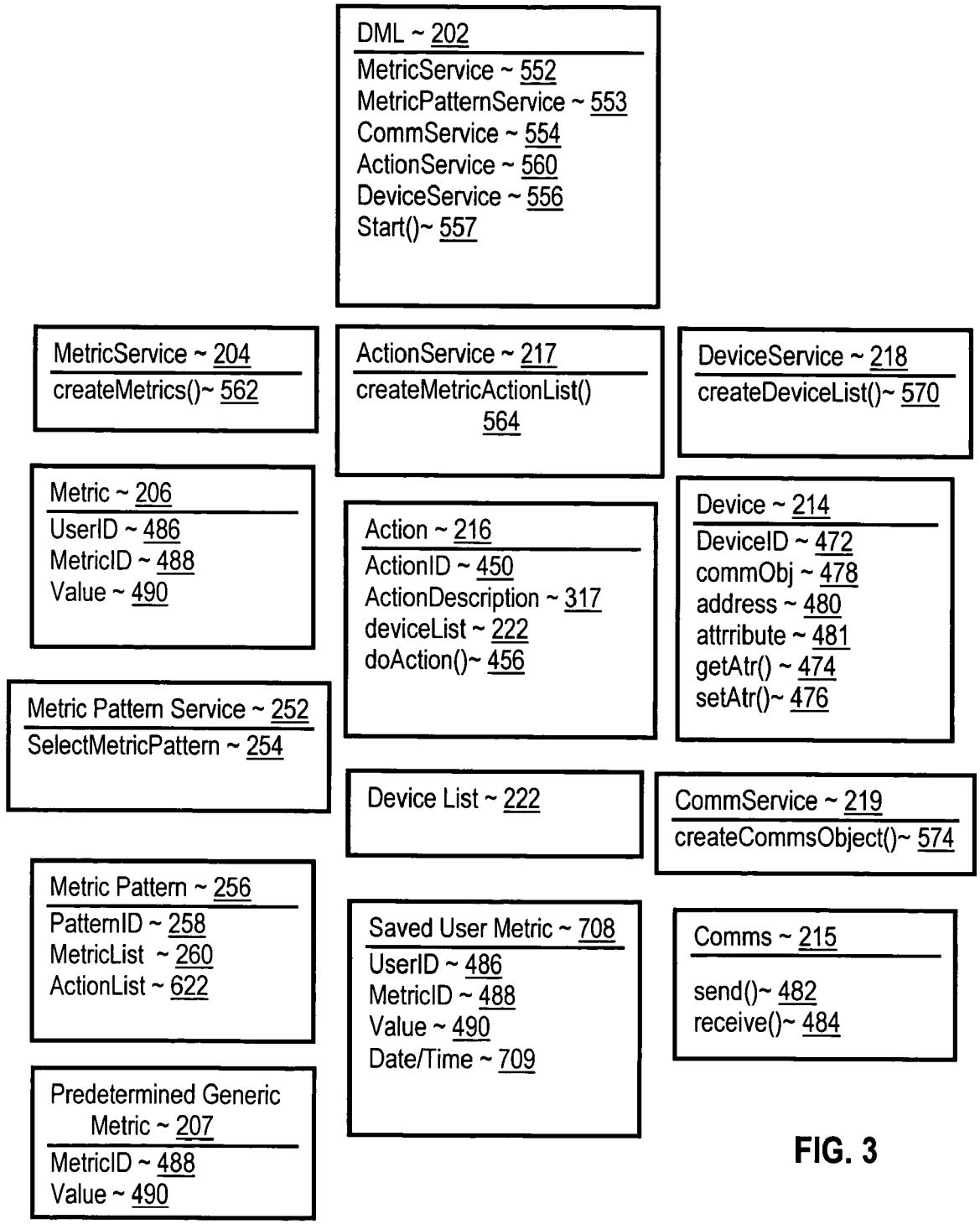
FIG. 3 is a block diagram illustrating exemplary classes useful in implementing methods for administering devices within a network in accordance with the present invention.

FIG. 3 is a block diagram illustrating exemplary classes useful in implementing methods for administering devices in accordance with the present invention. A "class" is a complex data structure that typically includes member methods, functions, or software routines as well as data elements. Instances of classes are referred to as "objects" or "class objects." A "method" or "member method" is a process performed by an object. The exemplary classes of FIG. 3 are presented as an aid to understanding of the present invention, not for limitation. While methods of administering devices in accordance with the present invention are discussed generally in this specification in terms of Java, Java is used only for explanation, not for limitation. In fact, methods of administering devices in accordance with the present invention can be implemented in many programming languages including C++, Smalltalk, C, Pascal, Basic, COBOL, Fortran, and so on, as will occur to those of skill in the art.

The class diagram of FIG. 3 includes an exemplary DML class (202). An instance of the exemplary DML class (202) of FIG. 3 provides member methods that carry out the steps useful in administering devices in accordance with the present invention. The exemplary DML class of FIG. 3 is shown with an start( ) method so that the DML can be started as a service in an OSGi framework. Although only one member method is shown for this DML, DMLs in fact will often have more member methods as needed for a particular embodiment. The DML class of FIG. 3 also includes member data elements for storing references to services classes, often created by the DML's constructor. In this example, the DML (202) provides storage fields for references to a metric service (552), a metric pattern service (553), a communication service (554), an action service (560), and a device service (556).

The metric service class (204) of FIG. 3 provides member methods that receive user metrics from a DML and create, in response to receiving the user metrics from the DML, an instance of a metric class. The metric service class (204) of FIG. 3 includes a createMetric(UserID, MetricID, MetricValue) member method (562). The createMetric( ) member method is, in some embodiments, a factory method parameterized with a metric ID that creates and returns a metric object in dependence upon the metric ID. In response to getting a user metric from the DML, the exemplary instance of the metric service class (204) of FIG. 3 creates an instance of a metric class and returns to the DML a reference to the new metric object.

Strictly speaking, there is nothing in the limitations of the present invention that requires the DML to create metric object through a factory method. The DML can for example proceed as illustrated in the following pseudocode segment:

```
// receive on an input stream a metric message
// extract from the metric message a userID,
// a metric ID, and a metric value, so that:
int userID = // userID from the metric message
int metricID = // metricID from the metric message
int metricValue = // metric value from the metric message
Metric aMetric = new Metric( );
aMetric.setUserID (userID);
aMetric.setMetricID(metricID);
```

```
    aMetric.setMetricValue(metricValue);
    aMetric.start ( );
```

This example creates a metric object and uses accessor methods to load its member data. This approach provides exactly the same class of metric object for each metric, however, and there are circumstances when metrics advantageously utilize different concrete class structures. In the case of metrics for heart rate and blood pressure, for example, both metric values may be encoded as integers, where a metric value for polar coordinates on the surface of the earth from a GPS transceiver, for example, may advantageously be encoded in a more complex data structure, even having its own Location class, for example. Using a factory method eases the use of more than one metric class. A DML using a factory method to create metric objects can proceed as illustrated in the following exemplary pseudocode segment:

```
// receive on an input stream a metric message
// extract from the metric message a userID,
// a metric ID, and a metric value, so that:
int userID = // userID from the metric message
int metricID = // metricID from the metric message
int metricValue = // metric value from the metric message
Metric aMetric = MetricService.createMetricObject(userID, metricID,
    metricValue);
aMetric.start( );
```

This example relies on the factory method createMetric( ) to set the parameter values into the new metric object. A metric service and a factory method for metric object can be implemented as illustrated in the following pseudocode segment:

```
//
// Metric Service Class
//
class MetricService
{
    public static Metric createMetricObject(userID, metricID,
    metricValue)
    {
        Metric aMetric;
        switch(metricID)
        {
            case 1: aMetric = new HeartRateMetric(userID,
                metricID, metricValue);
                break;
            case 2: aMetric =
                new BloodPressureMetric(userID, metricID,
                metricValue);
                break;
            case 3: aMetric = new GPSMetric(userID,
                metricID metricValue);
                break;
        } // end switch( )
        return aMetric;
    } // end createMetric( )
} // end class MetricService
```

MetricService in this example implements a so-called parameterized factory design pattern, including a factory method. In this example, the factory method is a member method named 'createMetricObject ( ).' CreateMetricObject( ) accepts three parameters, a user ID, a metric ID, and a metric value. CreateMetricObject( ) implements a switch statement in dependence upon the metric ID to select and instantiate a particular concrete metric class. The concrete metric classes in this example are HeartRateMetric, BloodPressureMetric, and GPSMetric, each of which extends a Metric base class. CreateMetricObject( ) returns to the calling DML a reference to a new metric object. The call from the DML:

Metric aMetric=MetricService.createMetricObject
        (userID, metricID, metricValue);

is polymorphic, utilizing a reference to the base class Metric, so that the calling DML neither knows nor cares which class of metric object is actually instantiated and returned. The following is an example of extending a Metric base class to define a concrete metric class representing a user's location on the surface of the earth extending a Metric base class:

```
Class GPSMetric extends Metric {
    int myUserID;
    int myMetricID
    class GPSLocation {
        Latitude myLatitude;
        Longitude myLongitude;
    }
    Class Latitude {
        String direction;
        int degrees;
        int minutes;
        int seconds;
    }
    Class Longitude {
        String direction;
        int degrees;
        int minutes;
        int seconds;
    }
    GPSLocation myLocation;
    GPSMetric(int userID, int metricID GPSLocation metricValue) {
        myUserID = userID;
        myMetricID = metricID:
        myLocation = metricValue;
    }
}
```

The example concrete class GPSMetric provides storage for latitude and longitude. GPSMetric provides a constructor GPSMetric( ) that takes integer arguments to set userID and metricID but expects its metricValue argument to be a reference to a GPSLocation object, which in turn provides member data storage for latitude and longitude.

The class diagram of FIG. 3 includes an exemplary metric class (206). The exemplary metric class (206) of FIG. 3 represents a user metric. A user metric comprises data describing an indication of user condition. An indication of a user's condition is a quantifiable aspect of a user's condition and a quantity measuring the aspect. Examples of quantifiable aspects of a user's condition include body temperature, heart rate, blood pressure, location, galvanic skin response, or any other aspect of user condition as will occur to those of skill in the art.

The exemplary metric class (206) of FIG. 3 includes a user ID field (486), a metric ID field (488), a value field (490). The user ID field (486) identifies the user. The metric ID (488) field identifies the user metric that an instance of the metric class represents. That is, the kind of user metric. The value field (490) includes a value of the user metric.

This exemplary metric class (206) is an example of a class that can in various embodiments be used in various embodiments as a generic class, instances of which can be used to store or represent more than one type of metric having identical or similar member data elements as discussed above. Alternatively in other embodiments, a class such as this example metric class (206) can be used as a base class to be extended by concrete derived classes each of which can have widely disparate member data type, also described above.

The exemplary class diagram of FIG. 3 includes a metric pattern service (252). The metric pattern service of FIG. 3 includes a member method selectMetricPattern( ) (254). In many embodiments, selectMetricPattern( ) (254) is parameterized with the metric IDs and metric values of a plurality of disparate user metrics currently maintained in metric cache for a user. selectMetricPattern( ) typically compares the plurality of metric IDs and metric values with a plurality of metrics that make up various metric patterns stored in a metric pattern database. If the metric IDs and corresponding metric values of the plurality of disparate user metrics match the metric IDs and metric values making up a stored metric pattern, selectMetricPattern( ) returns to its caller a metric pattern identifying a predetermined metric state of the user.

In some embodiments, the metric pattern is comprised of a plurality of predetermined generic metrics. That is, the metric pattern is comprised of metrics not created specifically for the user and determined to comprise a metric pattern representing a metric state common to many users. In other examples, the metric patterns are user metric patterns discovered by mining or otherwise analyzing user metrics previously received from the user and stored in memory.

The exemplary class diagram of FIG. 3 includes a metric pattern class (256). A metric pattern represents a metric state of the user. Typically, the metric patterns include a collection of metrics that together represent a predetermined metric state. For example, a collection of generic heart rate and blood pressure metrics may represent a metric state common to many users who are scared. Similarly, another collection of predetermined generic metrics may represent a metric state common to many users who are angry. Even further, metric pattern may be comprised of a set of previously received user metrics that together represent a specific metric state for the user.

The metric pattern (256) of FIG. 3 includes a PatternID field (258) uniquely identifying the metric pattern. In metric pattern class (256) of FIG. 3, a collection of metrics comprising the metric pattern are implemented as a metric list (260). A metric list is a data structure such as a Java list container, hashtable or any other data structure including a plurality of metrics, such as the predetermined generic metric (207) of FIG. 3 or the saved user metric (708) of FIG. 3. A predetermined generic metric (207) is a data structure similar to a user metric (206) but does not include a metric ID and is generic or common to many users.

A saved user metric of FIG. 3 is similar to a user metric, but was previously received and saved. In the example of FIG. 3, the saved user metric includes a data/time field (709) including the date and time the user metric was originally created. The date/time field facilitates discovering date and time specific metric patterns for a user among the saved user metrics.

The exemplary pattern class of FIG. 3 also includes data storage for an action list (622). An action list is a data structure containing action IDs identifying actions designed to administer devices to affect the user metric state defined by the metric pattern. A metric pattern identifying a user metric state of "angry," for example, may have an associated action list including an action ID that when executed results in turning on soothing music in the user's car.

The class diagram of FIG. 3 includes an action service class (217). The action service class includes member methods that instantiate an action list for a metric pattern, instantiate action objects, store references to the action objects in the action list, and return to a caller a reference to the action list, all of which can be implemented as illustrated by the following exemplary pseudocode ActionService class:

```
//
// Action Service Class
//
class ActionService
{
    public static Action createActionList(MetricPatternID)
    {
        ActionList anActionList = new ActionList( );
        int actionID;
        // with finds of database action records storing
        data describing actions
        for the associated metric pattern) {
            // obtain action ID from each matching action record
            actionID = // action ID from matching database record
            // * the action constructors below obtain from a device
            //service a list of devices administered by the
            action object
            switch(actionID)
            {
                case 1: Action anAction1 = new Action1(actionID);
                    anActionList.add(anAction1);
                    break;
                case 2: Action anAction2 = new Action2(actionID);
                    anActionList.add(anAction2);
                    break;
                case 3: Action anAction3 = new Action3(actionID);
                    anActionList.add(anAction3);
                    break;
                case 4: Action anAction4 = new Action4(actionID);
                    anActionList.add(anAction4);
                    break;
                case 5: Action anAction5 = new Action5(actionID);
                    anActionList.add(anAction5);
                    break;
            } // end switch( )
        } // end for( )
        return anActionList;
    } // end createActionListObject( )
} // end class ActionService
```

The createActionList ( ) method in ActionService class instantiates an action list for a user metric pattern with "ActionList anActionList=new ActionList( )." CreateActionList( ) then searches an action record table in a database for records matching its call parameters. For each matching record in the table, createActionList( ) instantiates an action object through its switch statement. The switch statement selects a particular concrete derived action class for each action ID retrieved from the action record table. CreateActionList( ) stores a references to each action object in the action list with "anActionList.add( )." CreateActionList( ) returns a reference to the action list with "return anActionList."

The class diagram of FIG. 3 includes an exemplary action class (216). An instance of the action class represents an action that when executed results in the administration of a device. The exemplary action class of FIG. 3 includes an action ID field (450). The doAction( ) method (456) in the exemplary action class (216) is programmed to obtain a device list (222) from, for example, a call to DeviceService.createDeviceList( ). A device list (222) is a data structure including a plurality of device IDs identifying physical devices administered by executing the action. Action.doAction( ) (456) typically then is also programmed to call interface methods in each device in its device list to carry out the device controlling action.

The class diagram of FIG. 3 includes a device service class (218). The device service class provides a factory method named createDeviceList(actionID) that creates a list of devices and returns a reference to the list. In this example, createDeviceList( ) operates in a fashion similar to ActionService.createActionList( ) described above, by instanting a device list, searching through a device table for device IDs from device records having matching action ID entries, instantiating a device object of a concrete derived device class for each, adding to the device list a reference to each new device object, and returning to a calling action object a reference to the device list. In this example, however, the factory method createDeviceList( ) not only retrieves a device ID from its supporting data table, but also retrieves a network address or communications location for the physical device to be controlled by each device object instantiated, as illustrated by the following exemplary pseudocode:

CommsService is a reference to a communications service from which a device object can obtain a reference to a communications object for use in communicating with the physical device controlled by a device object. DeviceAddress is the network address, obtained from the device table as described above, of the physical device to be controlled by a particular device object. The switch statement selects a particular concrete derived device class for each device ID retrieved from the device table. CreateDeviceList( ) stores references to each device object in the device list with "aDeviceList.add( )." CreateDeviceList( ) returns a reference to the device list with "return aDeviceList."

The class diagram of FIG. 3 includes an exemplary device class (214). The exemplary device class (214) of FIG. 3 includes a deviceID field (472) uniquely identifying the physical device to be administered by the execution of the action. The exemplary device class (214) of FIG. 3 includes an address field (480) identifying a location of a physical device on a data communications network. The exemplary device class (214) of FIG. 3 provides a communications field (478) for a reference to an instance of a communications

```
//
// Device Service Class
//
class DeviceService
{
    public static Device createDeviceList(actionID)
    {
        DeviceList aDeviceList = new DeviceList( );
        int deviceID;
        // with finds of database device records storing data describing devices
        for(/* each device record matching actionID */) {
            // obtain device ID and device address from each matching device record
            deviceID = // device ID from matching database record
            deviceAddress = // device address from matching database record
            // reminder: the device constructors below obtain from a device
            // service a list of devices administered by the device object
            switch(deviceID)
            {
                case 1: Device aDevice = new Device1(CommsService,
                    deviceAddress, deviceID);
                    break;
                case 2: Device aDevice = new Device2(CommsService
                    deviceAddress, deviceID);
                    break;
                case 3: Device aDevice = new Device3(CommsService
                    deviceAddress, deviceID);
                    break;
                case 4: Device aDevice = new Device4(CommsService
                    deviceAddress, deviceID);
                    break;
                case 5: Device aDevice = new Device5(CommsService
                    deviceAddress, deviceID);
                    break;
            } // end switch( )
            aDeviceList.add(aDevice);
        } //end for( )
        return aDeviceList;
    } // end createDeviceListObject( )
} // end class DeviceService
```

The createDeviceList( ) method in DeviceService class instantiates a device list for a metric with "DeviceList aDeviceList=new DeviceList( )." CreateDeviceList( ) then searches a device record table in a database for records having action IDs matching its call parameter. For each matching record in the table, createDeviceList( ) instantiates a device object through its switch statement, passing three parameters, CommsService, deviceAddress, and deviceID.

class that implements a data communications protocol to effect communications between an instance of a device class and a physical device.

The device class of FIG. 3 includes an attribute field (481) containing a value of current attribute of the device. An example of a current attribute of a device is an indication that the device is "on" or "off." Other examples of current attributes include values indicating a particular setting of a device. The device class of FIG. 3 also includes accessor methods (474, 476) for getting and setting attributes of a physical device. While the exemplary device class of FIG. 3 includes only one attribute field and accessor methods for getting and setting that attribute, many device classes useful in implementing methods of the present invention can support more than one attribute. Such classes can also include an attribute ID field and accessor methods for getting and setting each attribute the device class supports.

The exemplary class diagram of FIG. 3 includes a communications service class (219). The communications service class (219) provides a factory method named createCommsObject(deviceID, networkAddress) (574) that instantiates a communications object that implements a data communications protocol to effect communications between an instance of a device class and a physical device. The createCommsObject( ) method (574) finds a communications class ID in a communications class record in a communication class table having a device ID that matches its call parameter. In many embodiments, the createCommsObject( ) method (574) then instantiates a particular concrete derived communications class identified through a switch statement as described above, passing to the constructor the networkAddress from its parameter list, so that the new communications object knows the address on the network to which the new object is to conduct data communications. Each concrete derived communications class is designed to implement data communications according to a particular data communications protocol, Bluetooth, 802.11b, Lonworks, X-10, and so on.

Class diagram of FIG. 3 includes an exemplary communications base class (215). In typical embodiments, at least one concrete communications class is derived from the base class for each data communications protocol to be supported by a particular DML. Each concrete communications class implements a particular data communications protocol for communications device objects and physical devices. Each concrete communications class implements a particular data communications protocol by overriding interface methods (482, 484) to implement actual data communications according to a protocol.

Communications classes allow device classes (214) to operate independently with respect to specific protocols required for communications with various physical devices. For example, one light in a user's home may communicate using the LonWorks protocol, while another light in the user's home may communicate using the X-10 protocol. Both lights can be controlled by device objects of the same device class using communications objects of different communications classes, one implementing LonWorks, the other implementing X-10. Both device objects control the lights through calls to the same communications class interface methods, send( ) (482) and receive( ) (484), neither knowing nor caring that in fact their communications objects use different protocols.

Figure 4:
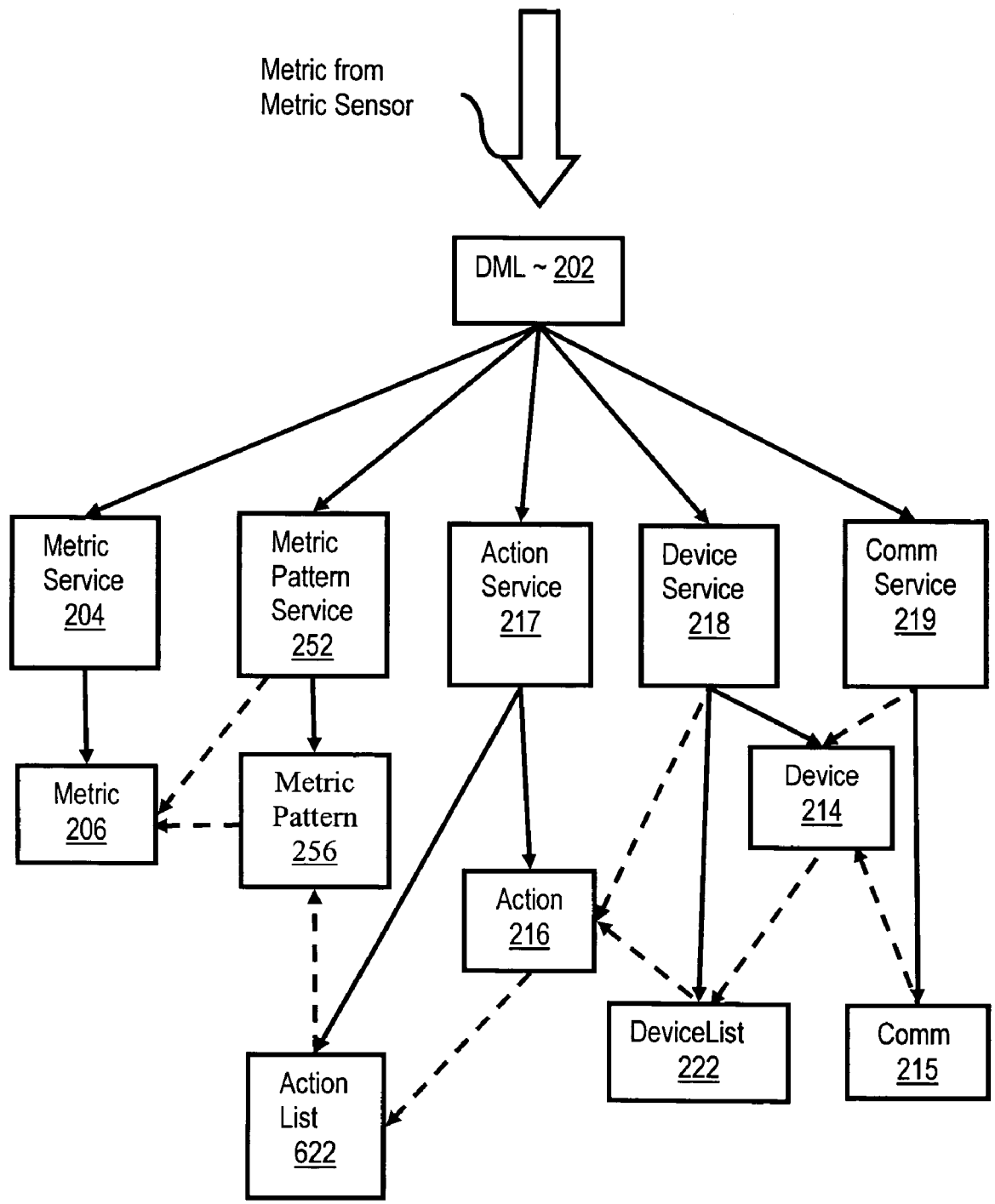
FIG. 4 is a class relationship diagram illustrating an exemplary relationship among some of the exemplary classes of FIG. 3.

FIG. 4 is a class relationship diagram illustrating an exemplary relationship among the exemplary classes of FIG. 3. In the class relationship diagram of FIG. 4, the solid arrows represent instantiation. The solid arrow points from the instantiating class to the instantiated class. In the class relationship diagram of FIG. 4, the dotted arrows represent references. The arrow points from a referenced class to a class whose objects possesses references to the referenced class. That is, an object-oriented relation of composition, a "has-a" relationship between classes, is shown by an arrow with a dotted line.

The exemplary class relationship diagram of FIG. 4 includes a DML class (202). A DML object of the DML class (202) instantiates an object of the metric service class (204), an object of the metric pattern service class (252), an object of the action service class (217), an object of the device service class (218) and an object of the communications service class (219).

When the DML receives a metric (200) from a metric sensor, the DML uses a call such as:

Metric aMetric=MetricService.createMetricObject
(userID, metricID, metricValue)

causing the metric service (204) to instantiate an object of the metric class (206). The metric object has a reference to an object of the metric pattern service class (252) and an object of the metric pattern class (256).

As shown in the example of FIG. 4, an object of the metric pattern service (252) class instantiates an object of the metric pattern class (256). The metric pattern object has a reference to an action list object (622).

As shown in the class relationship diagram of FIG. 4, an action service (217) instantiates an action list (622) and objects of action classes (216). The action list (622) is instantiated with references to each of the instantiated actions (216). Each action (216) is instantiated with a reference to the device service (218). In typical examples of methods according to the present invention, the action service (217) uses a parameterized factory method, such as createActionList( ), to instantiate an action list (622) and instantiate actions (216).

In the example of FIG. 4, the device service (218) instantiates a device list of the device list class (222) and instantiates a device object of the device class (214). The device list (222) is instantiated with a reference to the device object (214). The device object (214) is instantiated with a reference to the communications service (219). In typical examples of methods according to the present invention, the device service (218) uses a parameterized factory method, such as createDeviceList( ), to instantiate a device list (222) and instantiate a device object (214). The device service (218) passes, to the action (216), a reference to the device list (222).

In the example of FIG. 4, the communications service (219) instantiates a communications object of the communications class (215). In typical examples, the communications service (219) uses a parameterized factory method, such as createCommsObject( ), to instantiate a communications object (215). The communications service (219) passes, to the device object (214), a reference to the communications object (215).

Administering Devices in Dependence upon Metric Patterns

Figure 5:
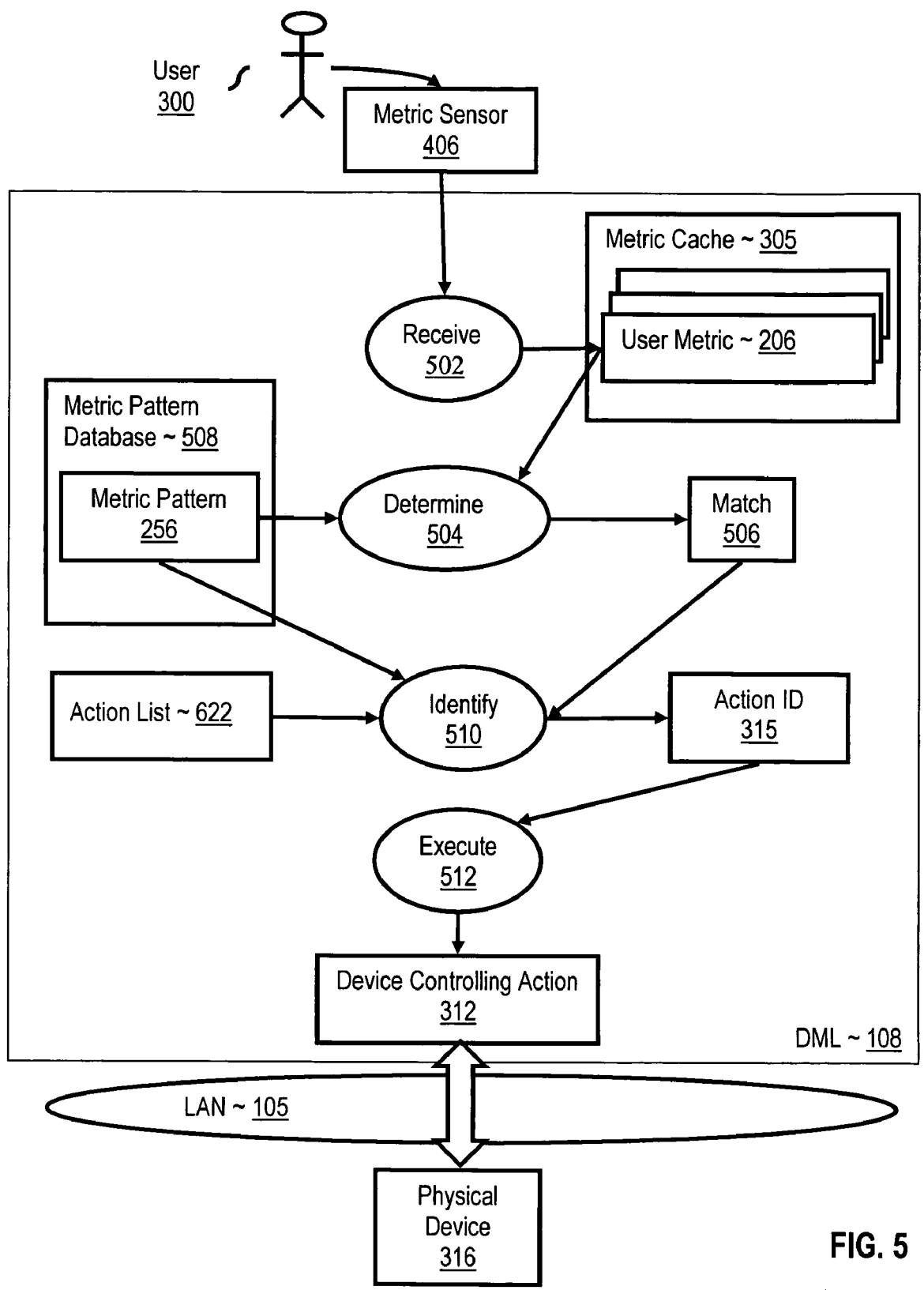
FIG. 5 is a data flow diagram illustrating an exemplary method of administering devices in accordance with the present invention.

FIG. 5 is a data flow diagram illustrating an exemplary method for administering devices. The method includes receiving (502) a plurality of disparate user metrics (206). As mentioned above, a "user metric" includes data describing an indication of user condition. An "indication of a user's condition" is a quantifiable aspect of a user's condition and a quantity measuring the aspect. Examples of quantifiable aspects of a user's condition include body temperature, heart rate, blood pressure, location, galvanic skin response, or any other aspect of user condition as will occur to those of skill in the art. The term 'disparate' user metrics means user metrics of different kinds. That is, user metrics of different kinds typically also having different metric values. In typical embodiments of the present invention, a user metric is implemented as a user metric data structure or record (206), such as the exemplary user metric (206) of FIG. 3.

In the method of FIG. 5 receiving (502) a plurality of disparate user metrics (206) includes receiving a plurality of disparate user metrics (206) from a metric sensor (406). In some examples of the method of FIG. 5, the metric sensor (406) reads an indication of a user's condition, creates a user metric in dependence upon the indication of a user's condition, and transmits the user metric to a DML. In many embodiments, the metric sensor transmits the user metric to the DML in a predefined data structure, such as the metric (206) of FIG. 5, using, for example, protocols such as Bluetooth, 802.11, HTTP, WAP, or any other protocol that will occur to those of skill in the art.

In the method of FIG. 5, receiving (502) a user metric includes receiving a user metric into metric cache memory (305). That is, a user metric is received by a DML and then stored in cache. In many embodiments of the method of FIG. 5, metric cache memory (305) is cache memory available to a DML to facilitate carrying out steps of administering devices in accordance with the present invention.

The method of FIG. 5 includes determining (504) whether the disparate user metrics (506) match a predetermined metric pattern (256). A metric pattern is typically a data structure including a collection of metrics that represents a metric state of the user. In some examples, metric patterns include a collection of predetermined generic metrics that together represent a predetermined metric state for the user. For example, a collection of generic heart rate and blood pressure metrics may represent a metric state common to many users who are scared. Similarly, another collection of predetermined generic metrics may represent a metric state common to many users who are angry. In other examples, metric patterns include a collection of the user's own metrics that were previously received and saved as a user metric pattern.

In the method of FIG. 5, determining (504) whether the disparate user metrics (206) match (506) a predetermined metric pattern (256) includes comparing the plurality of user metrics (206) with a plurality of predetermined generic metrics or saved user metrics associated with a metric pattern (256). That is, comparing the metric IDs and metric values of a plurality of disparate user metric in metric cache with a plurality of metric IDs and metric values of predetermined generic metrics that make up the predefined metric patterns or with the metric values and metric IDs of saved user metrics.

As will occur to those of skill in the art, in typical embodiments, the metric IDs and metric values of the user metrics do not have to be exactly the same as the metric IDs and metric values of the predetermined generic metrics or saved user metrics to be considered a match. In fact, the user metrics will typically not be exactly the same as the predetermined generic metrics or saved user metrics that make up the metric pattern. The degree to which the user metrics must be exactly the same as the predetermined generic metrics or saved user metrics to be considered a match will vary according to factors such as tolerances of the methods used to compare the user metrics and predetermined generic metrics or saved user metrics, tolerances of the methods and systems used to create the user metrics, as well as numerous other factors that will occur to those of skill in the art.

In some examples of the method of FIG. 5, determining (504) whether the disparate user metrics (206) match (506) a predetermined metric pattern (256) is carried out by one or more member methods in a metric pattern service, such as selectMetricPattern( ). Such member methods typically compare the user metrics in metric cache with predetermined generic metrics or saved user metrics making up predetermined metric patterns in a metric pattern database (508). If the user metrics match the collection of predetermined generic metrics or saved user metrics, such member methods typically return to their caller a metric pattern.

If the disparate user metrics (206) match (506) a predetermined metric pattern (256), the method of FIG. 5 includes identifying (510) an action (315) in dependence upon the predetermined metric pattern (256). As mentioned above, the actions themselves comprise software, and so can be implemented as concrete action classes embodied, for example, in a Java package imported into the DML at compile time and therefore always available during DML run time.

In the method of FIG. 5, identifying (510) an action (315) in dependence upon the predetermined metric pattern (256) typically includes retrieving an action ID (315) from an action list (622) associated with the metric pattern. 'Associated,' generally in this disclosure and subject to context, means associated by reference. That is, saying that an object of one class is associated with another object means that the second object possesses a reference to the first. The objects can be mutually associated, each possessing a reference to the other. Other relations among objects, aggregation, composition, and so on, are usually types of association, and the use of any of them, as well as others as will occur to those of skill in the art, is well within the scope of the present invention. In various embodiments, the action list can be implemented, for example, as a Java list container, as a table in random access memory, as a SQL database table with storage on a hard drive or CD ROM, and in other ways as will occur to those of skill in the art.

The method of FIG. 5 includes executing (512) the action (315). In some examples, executing (512) an action (315) is carried out by use of a switch( ) statement in the DML. Such a switch( ) statement can be operated in dependence upon the action ID and implemented, for example, as illustrated by the following segment of pseudocode:

```
switch (actionID) {
    Case 1: actionNumber1.take_action( ); break;
    Case 2: actionNumber2.take_action( ); break;
    Case 3: actionNumber3.take_action( ); break;
    Case 4: actionNumber4.take_action( ); break;
    Case 5: actionNumber5.take_action( ); break;
    // and so on
} // end switch( )
```

The exemplary switch statement selects a particular device controlling object for execution depending on the action ID. The device controlling objects administered by the switch( ) in this example are concrete action classes named actionNumber1, actionNumber2, and so on, each having an executable member method named 'take_action ( ),' which carries out the actual work implemented by each action class.

Executing (512) an action (315) can also be carried with a hash table in the DML.

Such a hash table can store references to action object keyed by action ID, as shown in the following pseudocode example. This example begins by an action service's creating a hashtable of actions, references to objects of concrete action classes associated with a particular metric ID, using action IDs as keys. In many embodiments, it is an action service that creates such a hashtable, fills it with references to action objects pertinent to a particular metric ID, and returns a reference to the hashtable to a calling metric object.

```
Hashtable ActionHashTable=new Hashtable( );
ActionHashTable.put("1", new Action1( ));
ActionHashTable.put("2", new Action2( ));
ActionHashTable.put("3", new Action3( ));
```

Executing a particular action then can be carried out according to the following pseudocode:

```
Action anAction=(Action) ActionHashTable.get("2");
if (anAction!=null) anAction.take_action( );
```

Many examples in this specification are described as implemented with lists, often with lists of actions, for example, returned with a reference to a list from an action service, for example. Lists often function in fashion similar to hashtables. Executing a particular action, for example, can also be carried out according to the following pseudocode:

```
List ActionList=new List( );
ActionList.add(1, new Action1( ));
ActionList.add(2, new Action2( ));
ActionList.add(3, new Action3( ));
```

Executing a particular action then can be carried out according to the following pseudocode:

```
Action anAction=(Action) ActionList.get(2);
if (anAction!=null) anAction.take_action( );
```

The three examples just above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

Figure 6:
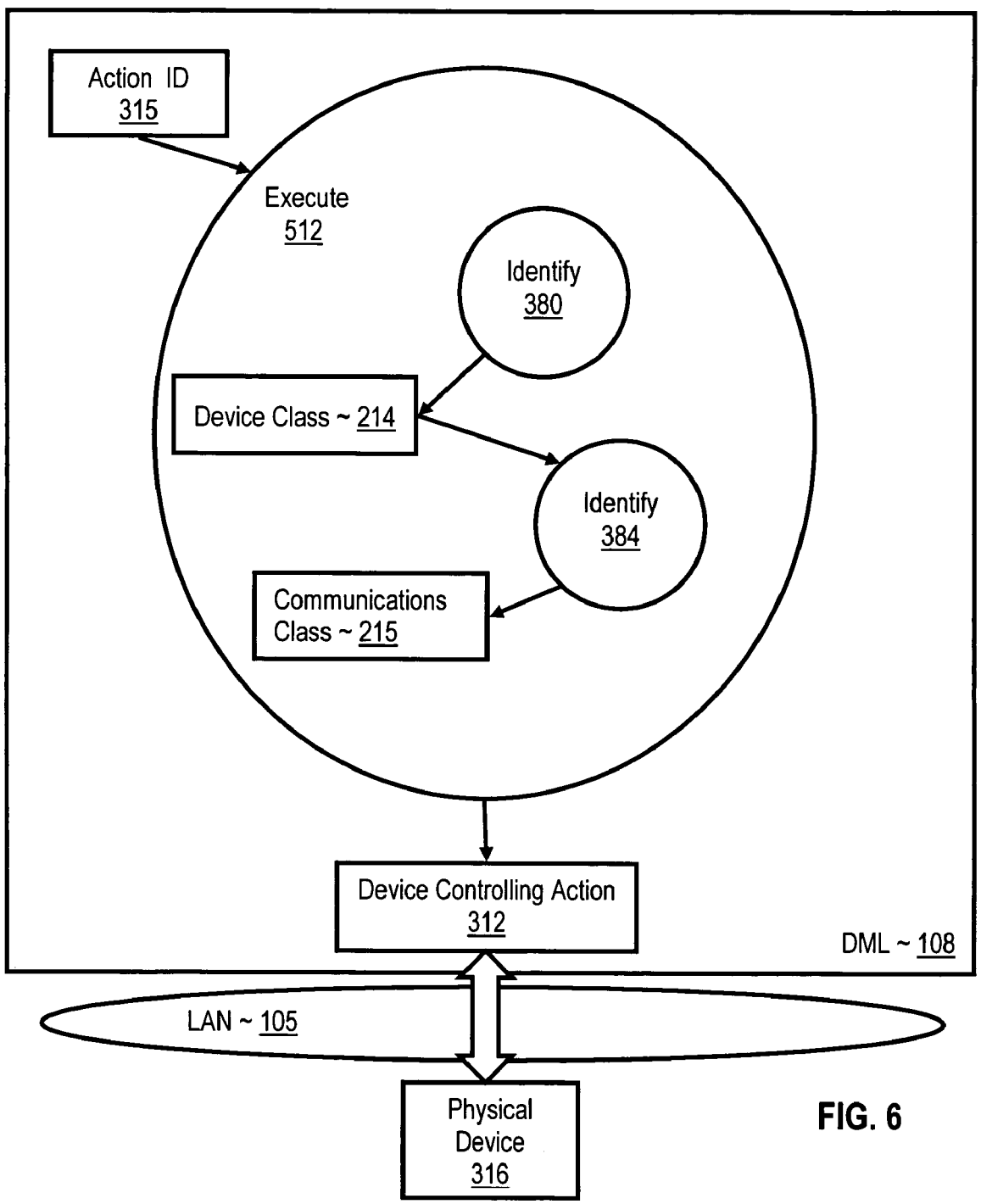
FIG. 6 is a data flow diagram illustrating an exemplary method of executing an action in accordance with the present invention.

FIG. 6 sets forth a data flow diagram illustrating an exemplary method of executing an action. In the method of FIG. 6, executing an action includes identifying (380) a device class (214) representing a physical device (316) administered by the action. Typical device classes include member methods for administering the device. Typical member methods for administering the device include member methods for getting and setting values of device attributes in physical devices. In the case of a lamp supporting multiple settings for light intensity, for example, a member method get( ) in a device class gets from the lamp a value for light intensity, and a member method set( ) in a device class sets the light intensity for the lamp.

In the method of FIG. 6, executing (512) an action (315) includes identifying (384) a communication class (215) for the device (316). To communicate the member methods of the device class to the physical device, a communications class implements a protocol for communicating with a physical device. Typical communications classes include member methods that send and receive data communications messages in accordance with the protocol implemented by a communication class. The member methods in a communication class send and receive data communications messages to and from a physical device. A communications class advantageously separates the protocols used to communicate with the physical device from the actions to be effected on the device, so that a device class interface comprising getAtr( ) and setAtr( ) methods, for example, can usefully communicate with a physical device by use of any data communications protocol with no need to reprogram the device class and no need to provide one device class for each combination of physical device and protocol.

For further explanation, consider the following brief use case. A user is driving a car in heavy traffic. A user's metric sensor reads the user's heart rate, blood pressure, and body temperature, creates metrics and transmits the metrics to the car's DML. The DML receives metrics into metric cache for the user and compares the user metrics with predetermined generic metrics that make up a plurality of metric patterns stored in a metric pattern database. The DML retrieves a matching metric pattern from the metric pattern database representing "a tense user." The DML retrieves from the metric pattern an action list including action IDs that when executed adjust the car's display to colors previously determined to be soothing to the user and adjusts the volume of the car's CD player to a level previously, determined to be appropriate for a tense user.

Creating User Metric Patterns Including User Notification

Figure 7:
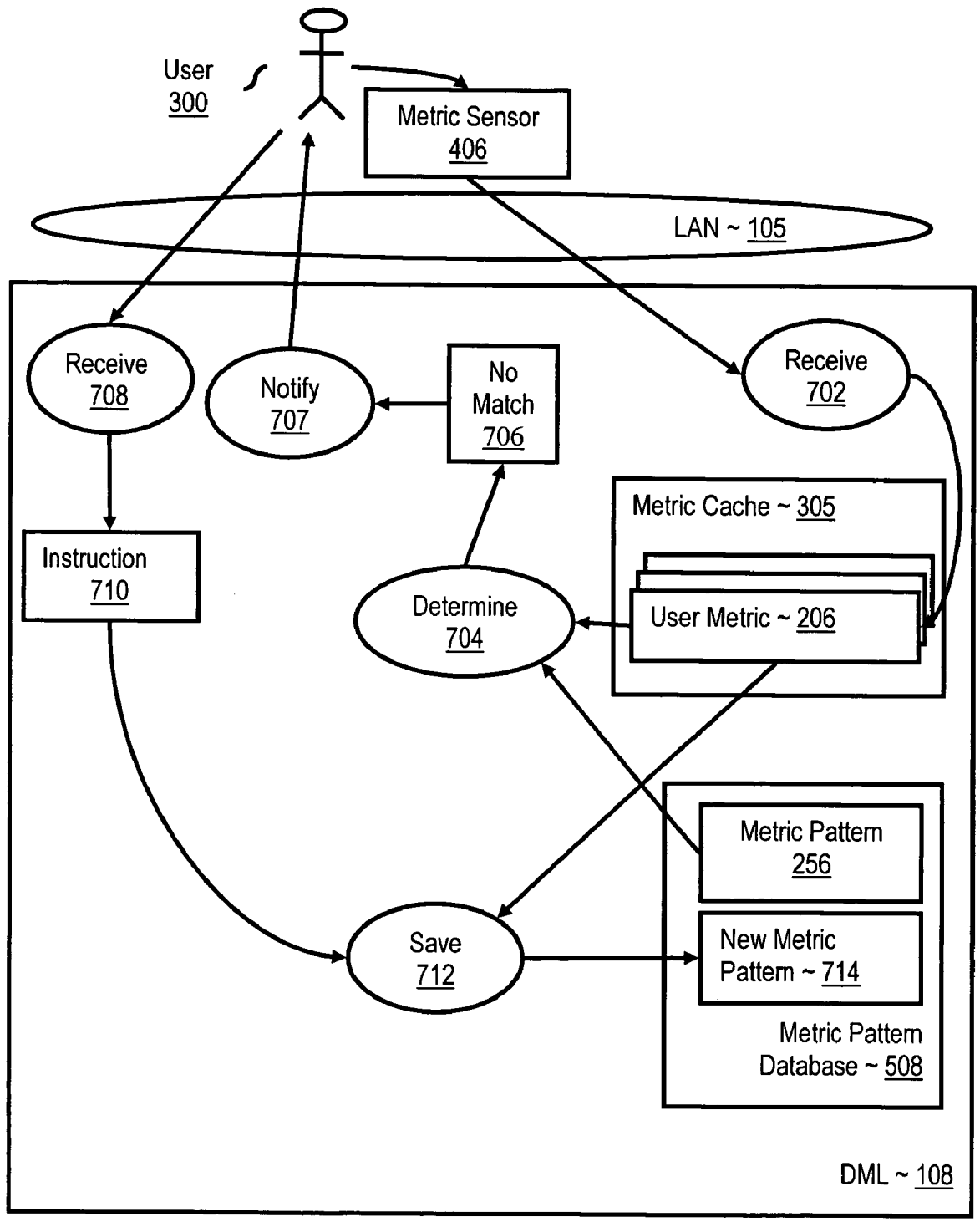
FIG. 7 is a data flow diagram illustrating an exemplary method of creating a user metric pattern in accordance with the present invention.

The previous section of the present disclosure discussed methods of administering devices in dependence upon metric patterns. The present section describes an exemplary method for creating a user metric pattern. FIG. 7 is a data flow diagram illustrating one exemplary method of creating a metric pattern. As discussed above, a metric pattern is typically a data structure that includes a collection of metrics that together represent a predetermined metric state for the user.

The method of FIG. 7 includes receiving (702), within the network (105), a plurality of disparate user metrics (206). As mentioned above, a "user metric" includes data describing an indication of user condition. An "indication of a user's condition" is a quantifiable aspect of a user's condition and a quantity measuring the aspect. Examples of quantifiable aspects of a user's condition include body temperature, heart rate, blood pressure, location, galvanic skin response, or any other aspect of user condition as will occur to those of skill in the art. The term 'disparate' user metrics means user metrics of different kinds. That is, user metrics of different kinds typically also having different metric values.

In the method of FIG. 7, receiving (702), within the network (105), a plurality of disparate user metrics (206) includes receiving a plurality of disparate user metrics (206) from a metric sensor (406) worn by the user (300). In some examples of the method of FIG. 7, the metric sensor (406) reads an indication of a user's condition, creates a user metric in dependence upon the indication of a user's condition, and transmits the user metric to a DML. In many embodiments, the metric sensor transmits the user metric to the DML in a predefined data structure using, for example, protocols such as Bluetooth, 802.11, HTTP, WAP, or any other protocol that will occur to those of skill in the art.

The method of FIG. 7 includes determining (704) that the plurality of disparate user metrics (206) received within the network (105) do not match (706) an existing predetermined metric pattern (256). An existing predetermined metric pattern (256) means a metric pattern that currently exists and is available for use in administering devices in accordance with, for example, the method of FIG. 5. In many examples of the method of FIG. 7, determining (704) that the disparate user metrics (206) do not match (706) a predetermined metric pattern (256) includes retrieving an existing metric pattern (256) from a metric pattern database (508) and comparing the plurality of user metrics (206) with a plurality of metrics associated with a metric pattern (256). Comparing the plurality of user metrics (206) with a plurality of metrics associated with a metric pattern (256) typically includes comparing the metric IDs and metric values of the metrics in metric cache with corresponding metric IDs and metric values of the metrics of the metric patterns.

As discussed above, the metric IDs and metric values of the user metrics do not have to be exactly the same as the metric IDs and metric values of the predetermined generic metrics or saved user metrics to be considered a match. By the same token, the degree to which the user metrics in metric cache must be different from the individual metrics of the metric pattern determine that they do not match will vary according to factors such as tolerances of the methods used to compare the user metrics in metric cache with the individual metrics of the metric patterns, tolerances of the methods and systems used to create the user metrics, as well as numerous other factors that will occur to those of skill in the art.

If the disparate user metrics do not match the metric pattern, the method of FIG. 7 includes notifying (707) the user (300) and making the user aware that the current user metrics do not match an existing metric pattern. Exemplary methods of notifying the user includes calling the user and playing the user a prerecorded message, sending a message to the user's PDA, sending the user an email, or any other method of notifying the user that will occur to those of skill in the art. In many examples of the method of FIG. 7, upon notifying the user that the user metrics in metric cache do not match an existing metric pattern, a user is prompted to enter an instruction to save the current user metrics as a new metric pattern.

The method of FIG. 7 includes receiving (708), from the user (300), an instruction (710) to save the plurality of disparate user metrics (206) as a new metric pattern (714). In many examples of the method of FIG. 7, receiving (708), from the user (300), an instruction (710) to save the plurality of disparate user metrics (206) as a new metric pattern (714) includes receiving a DTMF instruction, an email instruction or any other instruction that will occur to those of skill in the art.

The method of FIG. 7 includes saving the disparate user metrics as a metric pattern. In many examples of the method of FIG. 7, saving (712) the plurality of disparate user metrics (206) as a new metric pattern (714) includes creating a metric list including the plurality of disparate user metrics currently in metric cache and associating the metric list with a user metric pattern data structure. Creating a metric list typically includes creating a data structure such as a Java list container, hashtable, or other data structure and adding each identified saved user metric making up the metric pattern to the list. Associating the metric list with a user metric pattern data structure typically includes providing the metric pattern with a reference to the metric list including the identified subset of saved user metrics that comprises the metric pattern.

The method of FIG. 7 includes notifying the user when a determination is made that the user metrics in metric cache do not match an existing metric pattern. Such examples provide the user with notification in near real time. In alternative embodiments, each time the DML determines that a particular collection of user metrics in metric cache do not match any existing metric pattern, the DML saves the user metrics as a new metric pattern without notifying the user in near real time. Instead, the DML waits and notifies the user at a predetermined time. The user is then prompted to instruct the DML to either save the new metric pattern or delete it. Notifying the user at predetermined times reduces the possibility of interrupting the user with an unwelcome notification.

Figure 8:
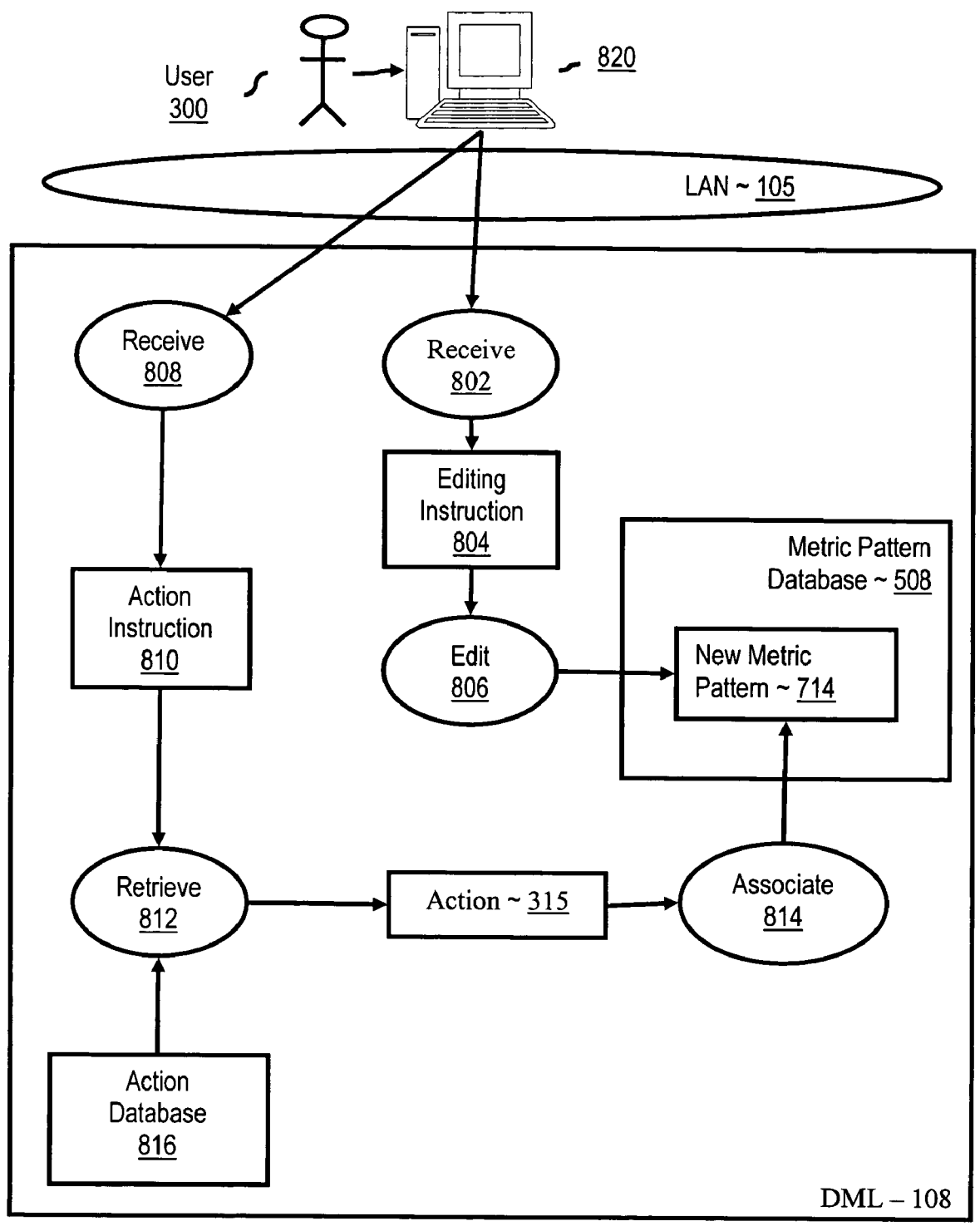
FIG. 8 is a data flow diagram illustrating some additional aspects of an exemplary method of creating a user metric pattern in accordance with the present invention.

In many examples of the method of FIG. 7, one or more of the user metrics saved as a metric pattern will have little or nothing to do with the actual state of the user's condition represented by the new metric pattern. That is, one or more of the user metrics are unnecessary, undesirable, or inefficient in identifying a metric pattern for a user to administer devices in accordance with, for example, the method of FIG. 5. In many such examples, it is desirable to delete one or more of the unnecessary, undesirable, or inefficient user metrics from the metric pattern. Furthermore, for the new user metric to be useful in administering devices at least one action must be associated with the new metric pattern. FIG. 8 is a data flow diagram illustrating some additional steps useful in creating a metric pattern that does not include unnecessary, undesirable, or inefficient user metrics and that has at least one associated action.

The method of FIG. 8 includes receiving (802) an editing instruction (804) from the user (300) and editing (806) the new metric pattern (714) in dependence upon the editing instruction. In typical embodiments of the method of FIG. 8, an editing instruction is an instruction to delete one or more of the user metrics that make up the new metric pattern. In some example of the method of FIG. 8, receiving (802) an editing instruction (804) from the user (300) is carried out through the use of a web browser installed on a computer (820) coupled for data communications with DML (108). In such examples, using a web browser, a user is empowered to access instruction screens that display the individual user metrics that make up the new user metric pattern and accept, from the user, editing instructions instructing the DML to delete one or more user metrics from the new metric pattern.

As stated above, for a new metric pattern to be useful in administering devices in accordance with for example the method of FIG. 5, at least one action must be associated with the new metric pattern. The method of FIG. 8 therefore includes receiving (808) an instruction (810) from a user (300) identifying an action to be associated with the new metric pattern. In many examples of the method of FIG. 8, receiving (808) an instruction (810) from a user (300) identifying an action to be associated with the new metric pattern is carried out through the use of a web browser installed on a computer (820) coupled for data communications with the DML (108). In some such embodiments, using a web browser, a user is empowered to access instruction screens that provide a list of actions available to be associated with the new metric pattern. Using such instruction screens the user can provide instructions instructing the DML to associate a particular available action with the new metric pattern.

The method of FIG. 8 includes retrieving (812) an action (315) from an action database in dependence upon the instruction (810) and associating (814) the action (315) with the metric pattern (714). In many examples of the method of FIG. 8, upon receiving an instruction (810) from a user (300) identifying a particular action to be associated with the new metric pattern, the DML retrieves the action from an action database in dependence upon instruction. The DML typically associates the action with the new metric pattern by providing the new metric pattern with a reference to the action.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for creating a user metric pattern, the method comprising:
   receiving, within a network, a plurality of disparate user metrics;
   determining that the plurality of disparate user metrics received within the network do not match a predetermined metric pattern; and
   saving the plurality of disparate user metrics as a new metric pattern.

2. The method of claim 1 wherein determining that the plurality of disparate user metrics received within the network do not match a predetermined metric pattern comprises comparing the plurality of disparate user metrics with a plurality of metrics associated with the predetermined metric pattern.

3. The method of claim 1 wherein receiving, within the network, a plurality of disparate user metrics comprises receiving a plurality of disparate user metrics from a metric sensor.

4. The method of claim 1 wherein saving the plurality of disparate user metrics as a new metric pattern comprises:
   creating a metric list including the plurality of disparate user metrics; and
   associating the metric list with a user metric pattern data structure.

5. The method of claim 1 further comprising receiving, from a user, an instruction to save the plurality of disparate user metrics as a new metric pattern.

6. The method of claim 1 further comprising editing the new metric pattern.

7. The method of claim 1 further comprising associating an action with the new metric pattern.

8. A system for creating a user metric pattern, the system comprising:
   means for receiving, within a network, a plurality of disparate user metrics;
   means for determining that the plurality of disparate user metrics received within the network do not match a predetermined metric pattern; and
   means for saving the plurality of disparate user metrics as a new metric pattern.

9. The system of claim 8 wherein means for determining that the plurality of disparate user metrics received within the network do not match a predetermined metric pattern comprises means for comparing the plurality of disparate user metrics with a plurality of metrics associated with the predetermined metric pattern.

10. The system of claim 8 wherein means for receiving, within the network, a plurality of disparate user metrics comprises means for receiving a plurality of disparate user metrics from a metric sensor.

11. The system of claim 8 wherein means for saving the plurality of disparate user metrics as a new metric pattern comprises:
    means for creating a metric list including the plurality of disparate user metrics; and
    means for associating the metric list with a user metric pattern data structure.

12. The system of claim 8 further comprising means for receiving, from a user, an instruction to save the plurality of disparate user metrics as a new metric pattern.

13. The system of claim 8 further comprising means for editing the new metric pattern.

14. The system of claim 8 further comprising means for associating an action with the new metric pattern.

15. A computer program product for creating a user metric pattern, the computer program product comprising:
    a recording medium;
    means, recorded on the recording medium, for receiving, within a network, a plurality of disparate user metrics;
    means, recorded on the recording medium, for determining that the plurality of disparate user metrics received within the network do not match a predetermined metric pattern; and
    means, recorded on the recording medium, for saving the plurality of disparate user metrics as a new metric pattern.

16. The computer program product of claim 15 wherein means, recorded on the recording medium, for determining that the plurality of disparate user metrics received within the network do not match a predetermined metric pattern comprises means, recorded on the recording medium, for comparing the plurality of disparate user metrics with a plurality of metrics associated with the predetermined metric pattern.

17. The computer program product of claim 15 wherein means, recorded on the recording medium, for receiving, within the network, a plurality of disparate user metrics comprises means, recorded on the recording medium, for receiving a plurality of disparate user metrics from a metric sensor.

18. The computer program product of claim 15 wherein means, recorded on the recording medium, for saving the plurality of disparate user metrics as a new metric pattern comprises:
    means, recorded on the recording medium, for creating a metric list including the plurality of disparate user metrics; and
    means, recorded on the recording medium, for associating the metric list with a user metric pattern data structure.

19. The computer program product of claim 15 further comprising means, recorded on the recording medium, for receiving, from a user, an instruction to save the plurality of disparate user metrics as a new metric pattern.

20. The computer program product of claim 15 further comprising means, recorded on the recording medium, for editing the new metric pattern.

21. The computer program product of claim 15 further comprising means, recorded on the recording medium, for associating an action with the new metric pattern.

* * * * *